United States Patent [19]

Shen

[11] Patent Number: 4,895,436

[45] Date of Patent: Jan. 23, 1990

[54] MIRROR ASSEMBLY

[75] Inventor: Gon-Yen Shen, Brookfield, Conn.

[73] Assignee: The Perkin-Elmer Corporation, Norwalk, Conn.

[21] Appl. No.: 233,792

[22] Filed: Aug. 19, 1988

[51] Int. Cl.$^4$ .............................................. G02B 5/08
[52] U.S. Cl. .................................................. 350/610
[58] Field of Search ................ 350/608, 609, 610, 611

[56] References Cited

U.S. PATENT DOCUMENTS

| | | | |
|---|---|---|---|
| 3,708,223 | 1/1973 | Sorensen et al. | 350/610 |
| 3,781,094 | 12/1973 | Griest | 350/610 |
| 3,884,558 | 5/1975 | Dunn, III et al. | 350/610 |
| 4,443,059 | 4/1984 | Wells | 350/610 |
| 4,550,986 | 11/1986 | Leach | 350/641 |
| 4,606,620 | 8/1986 | Nagano | 350/610 |
| 4,657,358 | 4/1987 | Anthony et al. | 350/610 |
| 4,657,359 | 4/1987 | Thompson et al. | 350/610 |
| 4,770,521 | 9/1988 | Thompson et al. | 350/610 |

Primary Examiner—Bruce Y. Arnold
Assistant Examiner—R. D. Shafer
Attorney, Agent, or Firm—Ronald G. Cummings; Edwin T. Grimes; Thomas P. Murphy

[57] ABSTRACT

The invention is directed to cooled mirror assemblies which include, in combination, a first heat exchanger plate having an upper surface forming a mirror facesheet and a plurality of cooling channels thereunder, a second distribution plate disposed underneath the first plate, which has an upper foam layer, hydraulic apparatus for feeding coolant fluid to the cooling channels and to the foam layer, and hydraulic apparatus for bleeding the coolant from the cooling channels and from the foam layer. According to one aspect of the invention the hydraulic apparatus for bleeding the coolant fluid is disposed closely adjacent the hydraulic apparatus for feeding the coolant fluid to counteract the effect of the temperature rise of the cooling fluid on the distortion of the mirror assembly.

13 Claims, 1 Drawing Sheet

MIRROR ASSEMBLY

FIELD OF INVENTION

This invention relates to mirror assemblies and more particularly to cooled mirror assemblies, which are particularly adapted, among other possible uses, for use with high energy lasers or the like.

BACKGROUND OF INVENTION

In order to improve mirror performance, particularly high energy laser mirrors, it is necessary to cool them and to effectively block heat penetration to the mirror substrate. Substrate growth due to heat penetration to the substrate is a major contributor to total mirror thermal irradiance mapping errors.

Heretofore, conventional channel designs were employed, but they had the drawback of allowing heat penetration to the substrate. Attempts were made to overcome this problem by using a multi-layer heat exchanger to suppress the heat penetration.

Also, heretofore, foam layer type heat exchangers were used. However, this resulted in unacceptably high pressure loss due to its high degree of resistance.

For purposes of suppressing substrate mapping errors, bimaterial mirrors, such as for example silicon with ULE®, Corning Glass Works, have been employed, but they often present the difficult problem of material coefficient of thermal expansion differential generated stress.

SUMMARY OF THE INVENTION

Briefly, the present invention is directed to a new and improved mirror assembly which includes, in combination, a first heat exchanger plate having an upper surface forming a mirror facesheet and a plurality of cooling channels thereunder, a second distribution plate disposed underneath the first plate which has an upper foam layer, means such as a hydraulic apparatus for feeding coolant fluid to said cooling channels and to said foam layer, and means such as a hydraulic apparatus for bleeding the coolant fluid from the cooling channels and from the foam layer, thereby to cool the mirror assembly.

According to one aspect of the invention the first and second plates are fabricated from the same material. Silicon carbide is a presently preferred material.

According to another aspect of the invention, the coolant flow in the foam layer is about 10% of the coolant flow in the cooling channels.

Further, according to still another aspect of the invention, the means for bleeding the coolant fluid from the cooling channels is disposed closely adjacent the means for feeding the fluid to the cooling channels. This structure serves to counteract the effect that the temperature rise of the cooling fluid has on distortion of the mirror assembly.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis of the designing of other assemblies and routines for carrying out the various purposes of the invention. It is important, therefore, that this disclosure be regarded as including such equivalent assemblies and routines as do not depart from the spirit and scope of the invention.

One embodiment of the invention has been chosen for purposes of illustration and description, and is shown in the accompanying drawings forming a part of the specification.

BRIEF DESCRIPTION OF THE DRAWINGS

The drawings, not drawn to scale, include.

DETAILED DESCRIPTION OF A PRESENTLY PREFERRED EMBODIMENT

Figure 1:
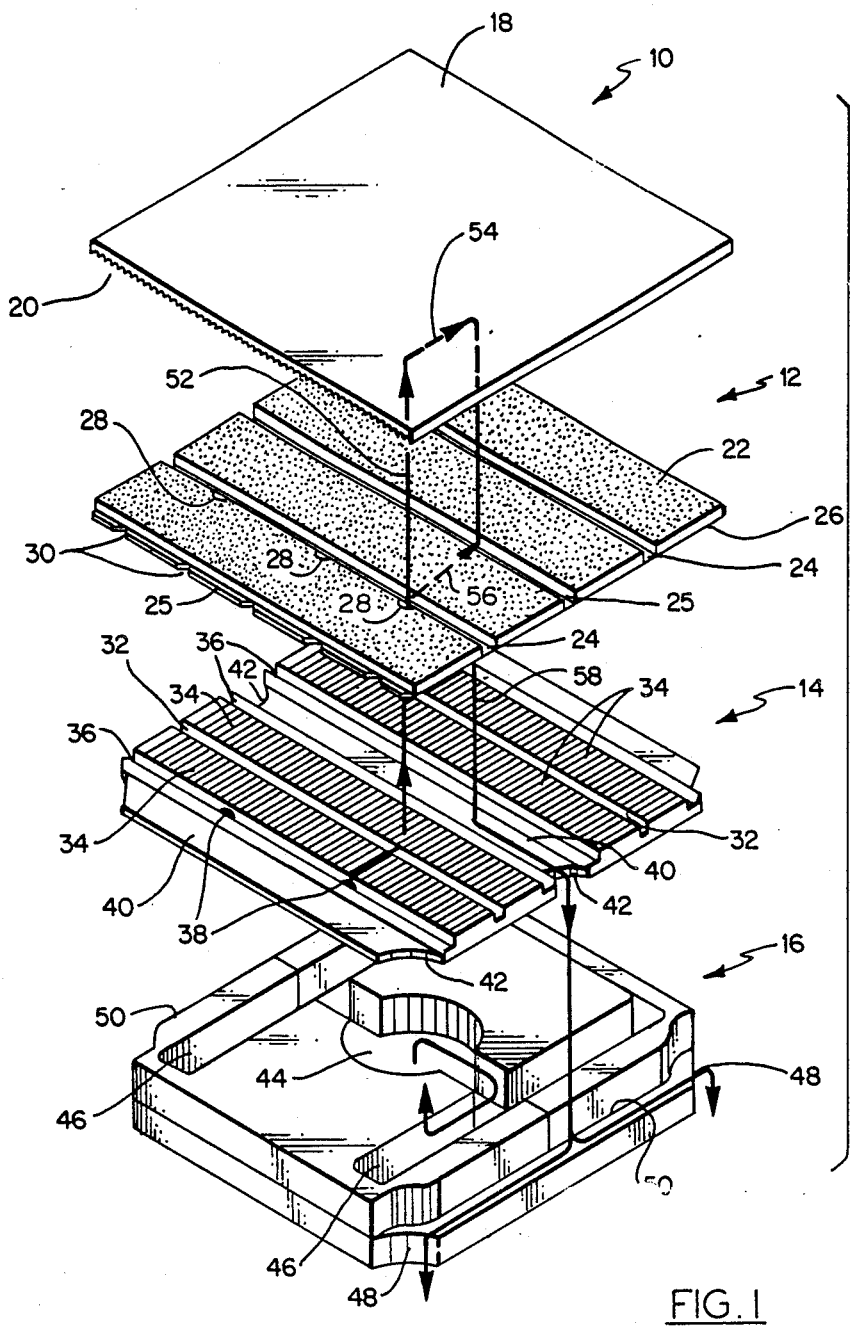
FIG. 1, which is an exploded, perspective view of a mirror assembly constructed according to the concepts of the present invention.

Referring to the drawing, the mirror assembly comprises four superimposed plates, including a first high flux heat exchanger plate 10, a second two-layer distribution plate 12, a third manifold plate 14 and a fourth backplate 16. In a preferred embodiment all four plates are fabricated from the same material. Silicon carbide has been found to be particularly preferred.

The upper surface 18 of the first or heat exchange plate 10 is coated with a mirror coating to form the facesheet. A plurality of cooling channels 20 are disposed below the facesheet. The channels are parallel and microscopic in size, with a large aspect ratio to provide a low pressure system utilizing a low rate laminar flow. A desirable channel is fabricated from silicon carbide and has the following characteristics, for example: 0.004 inches wide, 0.012 inches deep and 0.150 inches in length, and a flow rate of 0.368 gallons per hour per channel. The results of such a channel geometry is a higher Nusselt number, a smaller hydraulic diameter, and an increased effective wetted perimeter.

The second or two-layer distribution plate 12 has an upper silicon carbide foam layer 22 which serves, not as a primary cooling passage, but as a thermal insulation layer to cut off thermal penetration into the mirror substrate. That is, the foam material with its unique structural morphology is a very effective insulation material. It will be appreciated that the foam layer 22 is directly attached to and integrated with the cooling channels 20 and both elements are fabricated from silicon carbide, thereby alleviating the difficult problems encountered with material coefficient of thermal expansion differentials often encountered with bimaterial mirrors. Because the foam material layer 22 produces high pressure drops compared to the primary coolant channels 20, only a relatively low rate of flow, such as about 10% for example, would pass through the foamed layer. This low flow rate through the silicon carbide foam picks up any heat leakage from the primary heat exchanger and functions as an insulation layer. It will be appreciated that silicon carbide material in its foam state has the desirable advantage of retaining a very high mechanical strength.

The upper silicon carbide foam layer 22 is provided with elongated, spaced, parallel, feeding distribution slots 24 and bleeding slots 25. The feeding and bleeding distribution slots are alternately disposed with respect to each other. The slots extend substantially perpendicular to and in fluid flow relationship with the cooling channels 20 in the heat exchanger plate 10. These distribution slots are, for example, about 0.040 inches wide and are spaced apart about 0.150 inches. Under the foam layer 22 of the two-layer distribution plate 12 is a thin solid silicon carbide support layer 26. A plurality of rows of spaced, feeding holes 28 feed the feeding distribution slots 24, while a plurality of rows of spaced bleeding holes 30 bleed the bleeding distribution slots 25.

The third or manifold plate 14 is provided with inlet plenums 32 which are adjacent to and feed the rows of feeding holes 28. The plenums 32 are parallel to the rows of feeding holes 28 which, in turn, are parallel to the distribution slots 24. The plenums 32 are fed from a plurality of spaced inlet grooves 34. The inlet grooves are disposed substantially perpendicular to the plenums 32. The inlet grooves 34 are fed from a plurality of elongated inlet passages 36, which are substantially parallel to the plenums 32 and perpendicular to the inlet grooves 34. Each inlet passage 36 is provided with a row of spaced inlet openings 38. Interposed between two inlet passages 36 is a parallel outlet passage 40. This reduces the effect that the temperature rise of the cooling fluid has on distortion of the mirror assembly. That is, it has been found that thermal gradients can occur between the inlet and outlet passages 36 and 40. To reduce such an effect, the outlet passages are isolated by placing the inlet passages adjacent thereto as shown in the drawing. The separation between the inlet and outlet passages is only limited by the resulting stresses in the dividing walls. Since the wall thickness is made small, the thermal strain produced at these walls under a steady state temperature will induce only an insignificant amount of mirror surface distortion. Each outlet passage 40 is provided with a row of spaced outlet openings 42.

Still referring to the drawing, the fourth or backplate 16 is provided with an inlet port 44 which receives inlet cooling fluid from an outside source. Elongated inlet pathways 46 receive coolant from the inlet port 44 and carry it to the inlet openings 38 in the third manifold plate. Outlet ports 48 serve to bleed the coolant from the system. Elongated outlet pathways 50 interconnect the outlet ports 50 with the outlet openings 42 in the third manifold plate 14.

Arrow 52 in the drawing indicates the flow path of the incoming coolant fluid through the mirror assembly from the inlet port 44 to the cooling channels 20. Arrow 54 indicates the flow path through the cooling channels 20, and arrow 56 indicates the flow path through the foam layer 22. Arrow 58 indicates the flow path of the coolant fluid from the cooling channels and from the foam layer to the outlet ports 48.

It will be appreciated that the packaging configuration of the cooling fluid paths is so arranged that it provides modularity which can be utilized to fabricate mirrors of various sizes and shapes. Hydropressure induced ripple is small because of the small channel spans, the relatively low pressure drop, and the high stiffness of the mirror material.

It will thus be seen that the present invention does indeed provide a new and improved mirror assembly which effectively controls the residual heat penetration into the substrate, which substantially reduces the thermal gradients occurring between the feed and bleed distribution channels, and which provides modularity that can be utilized to fabricated mirrors of various sizes and shapes.

Although a certain particular embodiment of the invention is herein disclosed for purposes of explanation, further modification thereof, after study of this specification, will be apparent to those skilled in the art of mirror assembly structure to which the invention pertains. Reference should accordingly be had to the appended claims in determining the scope of the invention.

What is claimed is:

1. A mirror assembly comprising, in combination, a first heat exchanger plate, said plate having an upper surface forming a mirror facesheet, said plate having a plurality of cooling channels, a second distribution plate disposed underneath said first plate, said second plate having a foam layer, means for feeding coolant fluid to said cooling channels and to said foam layer, and means for bleeding said coolant fluid from said cooling channels and said foam layer, thereby to cool said mirror assembly.

2. A mirror assembly according to claim 1 wherein said first and second plates are fabricated from the same material.

3. A mirror assembly according to claim 2 wherein said material is silicon carbide.

4. A mirror assembly according to claim 1 wherein the coolant flow in said foam layer is about 10% of the coolant flow in said cooling channels.

5. A mirror assembly according to claim 1 wherein each of said channels is about 0.004 inches wide, about 0.012 inches deep and about 0.150 inches in length.

6. A mirror assembly according to claim 1 wherein said means for bleeding said coolant fluid from said cooling channels is disposed closely adjacent said means for feeding coolant fluid to said cooling channels, thereby counteracting the effect that the temperature rise of the cooling fluid has on distortion of the mirror assembly.

7. A mirror assembly comprising, in combination, a first heat exchanger plate, said plate having an upper surface forming a mirror facesheet, said plate having a plurality of substantially parallel cooling channels, a second distribution plate disposed underneath said first plate, said second plate having a foam layer, said foam layer being attached to and integrated with said cooling channels, said foam layer having a plurality of spaced, parallel feeding distribution slots and bleeding slots alternately disposed with respect to each other, said distribution slots being substantially adjacent to and in fluid flow relationship with said cooling channels, said second plate having a support layer underneath said foam layer, said support layer having a plurality of rows of spaced feeding holes for feeding said feeding distribution slots, said support layer having a plurality of rows of spaced bleeding holes for bleeding said bleeding distribution slots, a third manifold plate disposed underneath said second plate, said third plate having a plurality of elongated inlet passages, a parallel outlet passage interposed between each set of two inlet passages, means for interconnecting said inlet passages with said feeding holes in fluid flow communication, and means for interconnecting said outlet passages with said bleeding holes in fluid flow communication.

8. A mirror assembly comprising, in combination, a first heat exchanger plate, said plate having an upper surface forming a mirror facesheet, said plate having a plurality of cooling channels, a second distribution plate disposed underneath said first plate, said second plate having a foam layer, said foam layer being attached to and integrated with said cooling channels, said foam layer having a plurality of spaced, feeding distribution slots and bleeding slots alternately disposed with respect to each other, said distribution slots being substantially adjacent to and in fluid flow relationship with said cooling channels, said second plate having a support layer underneath said foam layer, said support layer having a plurality of rows of spaced feeding holes for feeding said feeding distribution slots, said support layer having a plurality of rows of spaced bleeding holes for bleeding said bleeding distribution slots, a third manifold plate disposed underneath said second plate, said bleeding distribution slots, a third manifold plate disposed underneath said second plate, said third plate having inlet plenums for feeding said rows of feeding holes, said third plate having a plurality of spaced inlet grooves for feeding said plenums, said third plate having a plurality of elongated inlet passages for feeding said inlet grooves, each inlet passage being provided with a row of spaced inlet openings, an outlet passage interposed between each set of two inlet passages, said outlet passage being disposed in fluid flow communication with said bleeding holes, each outlet passage having a row of spaced outlet openings.

9. A mirror assembly according to claim 8 wherein all of said plates are fabricated from the same material.

10. A mirror assembly according to claim 8 further comprising a fourth backplate disposed underneath said third plate, said fourth plate having an inlet port for receiving cooling fluid from an outside source, said fourth plate having elongated inlet pathways for receiving coolant from said inlet port and carrying it to said inlet openings in the third plate, said forth plate having outlet ports to bleed coolant from the mirror assembly, said forth plate having outlet pathways interconnecting said outlet ports with said outlet openings in the third plate.

11. A mirror assembly according to claim 10 wherein said cooling channels are substantially parallel, and wherein said feeding distribution slots are substantially parallel, and wherein said plenums are substantially parallel to the rows of feeding holes and to said distribution slots, and wherein said inlet grooves are substantially perpendicular to said plenums, and wherein said inlet passages are substantially parallel to said plenums and perpendicular to the inlet grooves, and wherein said outlet passage is substantially parallel to said inlet passages.

12. A fluid cooled mirror assembly comprising:
   a heat exchanger plate having parallel channels on one side and a reflective surface on the other;
   a foam distribution plate positioned adjacent said channels and having distribution slits therein in a parallel plane and perpendicular to said channels and feeding and bleeding holes therethrough; said foam distribution plate being porous permitting a relatively low transpiration flow rate compared to the flow rate in said channels; and
   a manifold plate having inlet grooves perpendicularly positioned in a parallel plane between inlet plenums and positioned adjacent said foam distribution plate;
   whereby said heat exchanger plate primarily acts to cool the reflective surface and said foam distribution plate primarily acts as a thermal insulation layer to cut off thermal penetration into the mirror assembly reducing thermal distribution.

13. A fluid cooled mirror assembly as in claim 12 wherein:
   the relatively low transpiration flow rate is less than 10% of the flow rate in said channels.

* * * * *